3,053,858
10-FLUORO-19-NOR STEROIDS
John S. Mills, Mexico City, Mexico, assignor, by mesne assignments, to Syntex Corporation, a corporation of Panama
No Drawing. Filed Feb. 24, 1960, Ser. No. 10,560
Claims priority, application Mexico Feb. 28, 1959
30 Claims. (Cl. 260—397.3)

The present invention relates to cyclopentanophenanthrene compounds and to a novel process for the production thereof.

More particularly the invention relates to novel 10-fluoro-19-nor-steroid compounds.

The novel compounds of the present invention are valuable hormones as hereinafter are more fully described.

The novel compounds of the present invention which are valuable androgenic-type hormones which exhibit anabolic activity with a favorable anabolic-androgenic ratio and which also exhibit anti-gonadotropic and anti-estrogenic activity may be characterized by the following formula:

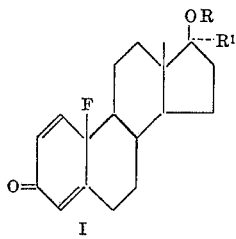

I

In the above formula, R represents hydrogen or the acyl group of a hydrocarbon carboxylic acid containing from 1 to 12 carbon atoms. R' represents hydrogen or an aliphatic hydrocarbon containing from 1 to 8 carbon atoms. Typical of the latter are alkyl, alkenyl, and alkinyl groups such as methyl, ethyl, propyl, butyl, vinyl, propen(1)yl, buten(1)yl, ethinyl, propin(1)yl, and butin(1)yl groups. The acyl group may be saturated or unsaturated, straight chain or branched chain aliphatic, cyclic or mixed cyclic aliphatic and may be substituted as by hydroxy, acyloxy containing from 1 to 12 carbon atoms, alkoxy containing from 1 to 5 carbon atoms, amino or halogen such as bromine, chlorine or fluorine. Typical ester groups are the acetate, propionate, butyrate, hemisuccinate, enanthate, caproate, benzoate, trimethylacetate, aminoacetate, acetoxy-acetate, methoxyacetate, phenoxyacetate, phenylpropionate, cyclopentylpropionate and β-chloropropionate. Water soluble salt derivatives such as the alkali or alkaline earth salts of the hemisuccinates or the hydrohalides of the aminoesters, particularly the amino acetate are also included in the present invention.

When R' is lower alkinyl or alkenyl, the compounds exhibit potent progestational activity as well as anti-estrogenic and anti-gonadotrophic activity.

The novel compounds of the present invention which exhibit anti-estrogenic activity may be represented by the following formulae:

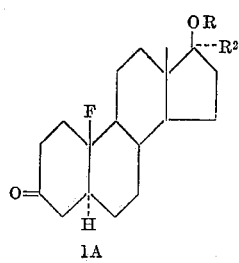

IA and

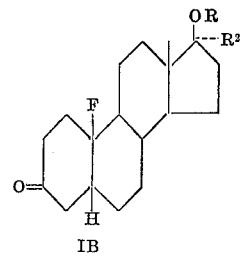

IB

In the above formulae, R has the same meaning as set forth previously. $R^2$ represents hydrogen, alkyl or alkenyl containing from 1 to 8 carbon atoms.

The novel compounds of the present invention which are also potent progestational agents having anti-estrogenic and anti-pituitary activity may be characterized by the following formulae:

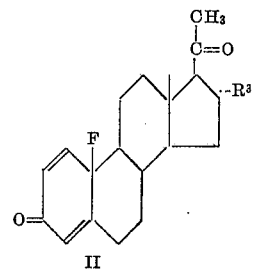

II and

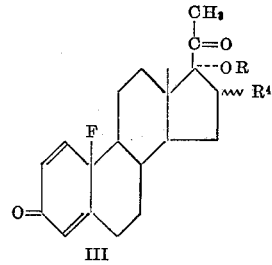

III

In the above formulae, R has the same meaning as previously set forth. $R^3$ represents hydrogen or α-methyl. $R^4$ represents hydrogen, α-methyl or β-methyl.

The wavy line at C–16 represents a generic expression for the α and β steric configuration for the substituent at C–16.

The novel compounds of the present invention which are valuable hormones exhibiting anti-estrogenic and anti-pituitary activity may be characterized by the following formula:

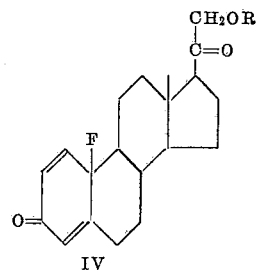

IV

In the above formula, R represents the same groups as heretofore set forth.

The novel compounds of the present invention which are potent progestational agents as well as intermediates for the preparation of valuable cortical hormones by introduction of oxygen at C-11 are the diesters of 10-fluoro-19-nor-Δ¹,⁴-pregnadiene-17α,21-diol-3,20-dione and may be represented by the following formula:

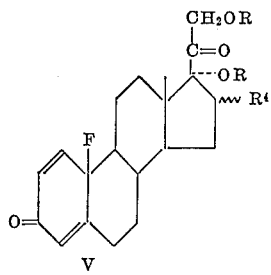

V

In the above formula, R and R⁴ represent the same groups as heretofore set forth.

The novel compounds of the present invention which are potent cortical hormones having anti-inflammatory, thymolytic, eosinopenic, glycogenic, anti-androgenic and anti-estrogenic activity may be characterized by the following formula:

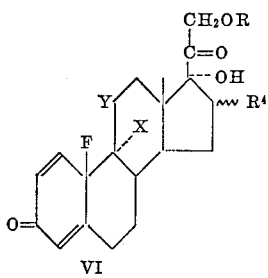

VI

In the above formula, R and R⁴ represent the same groups as previously set forth. Y represents keto or β-hydroxy. X represents hydrogen, chlorine, bromine, or fluorine.

The preparation of the 10-fluoro-19-nor-cyclopentanopolyhydrophenanthrene compounds which form the subject of the present invention may be illustrated by the following equation insofar as rings A and B are concerned

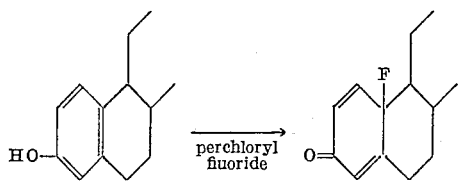

In the preparation of compounds of type I, estradiol or the 17-esters thereof, with or without the C-17α hydrocarbon substituent, were treated with a stream of perchloryl fluoride at room temperature in an inert solvent such as dimethylformamide or benzene to produce the corresponding 10-fluoro-19-nor-Δ¹-testosterone and/or esters thereof with or without the C-17α hydrocarbon substituent. The starting estradiols which have a 17α-methyl, 17α-ethyl or 17α-vinyl substituent are well known. Other 17α-alkyl derivatives of estradiol, such as for example 17α-propyl, 17α-butyl, 17α-heptyl were prepared by treating the methyl ether of estrone with the respective Grignard reagent, followed by hydrolysis of the ether group by conventional methods as with a mixture of acetic acid and hydrochloric acid. The 17α-alkenyl and -17α-alkinyl estradiols which serve as the starting materials for the preparation of certain of the novel compounds of the present invention were prepared according to the method described by Colton in U.S. Patent 2,838,530. Thus, the 3-methyl ether of estrone was treated with an alkenyl Grignard reagent such as methallyl magnesium bromide to furnish 17α-metallyl-3-methoxy-1:3:5(10) estratriene-17β-ol which was converted into 17α-methallyl estradiol. By reaction of a solution of estrone methyl ether in liquid ammonia with sodium amide and an alkine such as propine, followed by addition of ammonium chloride with subsequent evaporation of the ammonia, there was obtained the 3-methyl ether of 17α-methylethinylestradiol.

In producing the novel 10-fluoro-19-nor-Δ¹-testosterones esterified at C-17, the starting estradiols were first esterified at C-17 prior to introduction of the fluoro group at C-10. Thus the esterification of an estradiol lacking a substituent at C-17 was achieved by treatment of the 3-methyl ether with the respective acid anhydride in pyridine solution, followed by acid hydrolysis of the ether group by conventional methods to furnish the starting estradiol esterified at C-17. Alternatively, the 3-acetate of estradiol was esterified at C-17 by conventional methods followed by selective hydrolysis of the acetate group at C-3 as with dilute methanolic potassium hydroxide. Esterification of an estradiol containing an aliphatic hydrocarbon substituent at C-17α was effected by heating the 3-methyl ether thereof in pyridine solution for a prolonged period of time with the corresponding carboxylic acid anhydride containing up to 12 carbon atoms of the type previously mentioned. Alternatively, the esterification was effected by treatment with the respective anhydride in the presence of a catalyst such as p-toluenesulfonic acid, and optionally in an inert solvent such as benzene. By heating the resulting 3-methoxy-17β-acyloxy-1:3:5-estratriene substituted at C-17α with an aliphatic hydrocarbon of the type previously set forth with hydrogen chloride, there were obtained the 17α-aliphatic hydrocarbon-17β-acyloxy derivatives of estradiol which upon further treatment with dilute methanolic potassium hydroxide were converted into the free estradiols substituted at C-17α with an aliphatic hydrocarbon group.

The formation of compounds of type IA and IB by hydrogenation of compounds of type I may be illustrated by the following equation:

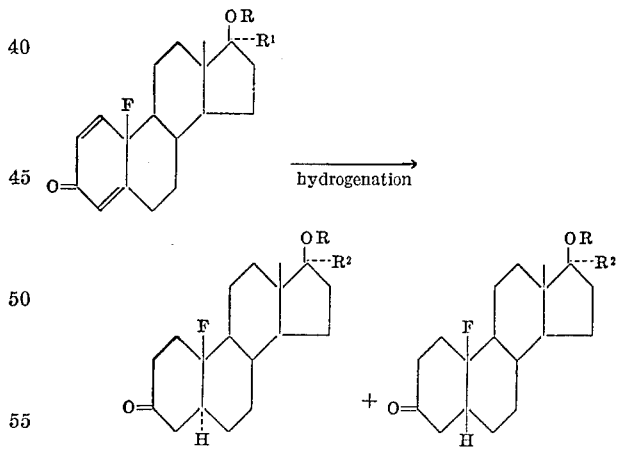

The hydrogenation was carried out in a solvent such as pyridine, dioxane, or ethanol and in the presence of a catalyst composed of 5-10% palladium on an inert support such as barium sulphate. When R' was alkenyl or alkinyl, the nature of R² depended upon the solvent utilized in the hydrogenation step. Thus, when 10-fluoro-17α-ethinyl-19-nor-Δ¹-testosterone was hydrogenated in pyridine solution, there was formed 10-fluoro-17α-vinyl-19-nor-5β-androstan-17β-ol-3-one and 10β-fluoro-17α-vinyl-19-nor-5α-androstan-17β-ol-3-one; when the hydrogenation was effected in ethanol solution, there was obtained 10-fluoro-17α-ethyl-19-nor-5β-androstan-17β-ol-3-one and 10-fluoro-17α-ethyl-19-nor-5α-androstan-17β-ol-3-one.

In preparing compounds of types II and III, 17β-acetyl-1:3:5-estratriene-3-ol, the 16α-methyl derivative thereof, or the 17α-hydroxy or 17α-acyloxy derivatives with or without a 16α-methyl or 16β-methyl substituent were similarly treated with a stream of perchloryl fluoride in an inert solvent at room temperature as hereinabove set forth to obtain the corresponding 10-fluoro-19-nor-Δ¹-progresterone, the 16α-methyl-10-fluoro-19-nor-Δ¹-progesterone, the 17α-hydroxy or 17α-acyloxy-10-fluoro-19-nor-Δ¹-progesterone with or without the methyl group at C–16 in α or β steric configuration. When the 17α-acyloxy derivative of the novel 10-fluoro-19-nor-Δ¹-progesterone are desired, it is preferable to start from the 17α-ester of the 17β-acetyl-1:3:5-estratriene-3,17α-diol which are disclosed in copending application Serial No. 830,209 filed on July 29, 1959, now abandoned.

The preparation of compounds of type IV was effected in the same manner as hereinabove set forth except that a 21-hydroxy- or 21-acyloxy-19-nor-Δ¹,³,⁵(¹⁰)-pregnatriene-3β-ol-20-one were utilized to obtain the novel 10-fluoro-19-nor-1-dehydro-desoxycorticosterone or the 21-ester of 10 - fluoro - 19 - nor - 1 - dehydro - desoxycorticosterone. The starting 21-ester of 19-nor-Δ¹,³,⁵(¹⁰)-pregnatriene-3,21-diol-20-one was prepared by first esterifying both hydroxyl groups by reaction with an excess of the anhydride of the carboxylic acid of the type previously set forth, in pyridine solution at room temperature and then selectively hydrolysing the ester group at C–3 by treatment with an acid, as for example, hydrochloric acid in aqueous dioxane.

In preparing compounds of type V, the known 3-acetate of 17β-acetyl-1:3:5-estratriene-3,17-diol was monobrominated in chloroform at C–21, followed by hydrolysis of the ester group at C–3 by treatment with dilute methanolic hydrochloric acid and then subsequently followed by acetolysis at C–21 by refluxing with a mixture of potassium acetate and sodium iodide in acetone to thus produce the 21-acetate which in turn was hydrolyzed with dilute methanolic potassium hydroxide to obtain the free 19 - nor - Δ¹,³,⁵(¹⁰) - pregnatriene - 3,17α,21 - triol - 20 - one. For preparing the compound esterified at C–21 and C–17, the 21-acetate of 19-nor-Δ¹,³,⁵(¹⁰)-pregnatriene-3,17α,21-triol-20-one was converted into its triacetate for example, by reaction with acetic anhydride in solution in acetic acid and in the presence of p-toluene-sulfonic acid. Selective hydrolysis of the acetoxy group at C–3 yielded the 17,21-diacetate, which upon treatment with perchloryl fluoride gave the diacetate of 10-fluoro-19-nor-Δ¹,⁴-pregnadiene-17α,21-diol-3,20-dione.

In introducing the fluoro group at C–10 of 19-nor-Δ¹,³,⁵(¹⁰) - pregnatriene - 3,17α,21 - triol - 20 - one - 21-acetate, a stream of perchloryl fluoride was introduced at room temperature for about 15 hours into a dimethyl-formamide solution of the product; the acetoxy group of the resulting product was hydrolyzed with dilute methanolic potassium hydroxide. The thus formed 10-fluoro-19-nor-Δ¹,⁴-pregnadiene-17α,21-diol-3,20-dione was incubated with *Cunninghamella bainieri* ATCC 9244 or bovine adrenal glands to form compounds of type VI, specifically, 10-fluoro-19-nor-prednisolone, which was then acetylated at C–21 by conventional methods. By incubation with *Rhizopus nigricans* ATCC 6227b, there was introduced an 11α-hydroxyl group.

A halogen atom was then introduced at C–19 by the method described by Fried et al., J. Am. Chem. Soc. 79, 1230 (1957). By heating the 21-acetate of 10-fluoro-19-nor-prednisolone or the 11-epimer thereof with methanesulfonyl chloride in mixture with pyridine and dimethylformamide, there was obtained the 21-acetate of 10 - fluoro - 19 - nor - Δ¹,⁴,⁹(¹¹) - pregnatriene - 17α,21-diol-3,20-dione which upon treatment with a reagent capable of generating hypogromous acid such as an N-bromoimide or N-bromoamide or the hypobromite of an alkali or alkali-earth metal, preferably N-bromoacetamide and aqueous perchloric acid in dioxane, was converted into the 21-acetate of 9α-bromo-10-fluoro-19-nor-prednisolone. The latter compound was refluxed with potassium acetate in dioxane-methanol to form the 21-acetate of 10-fluoro-9β,11β-oxido-19-nor-Δ¹,⁴-pregnadiene-17α,21-diol-3,20-dione. By reaction with hydrogen fluoride or hydrogen chloride in an inert solvent such as chloroform or a mixture of tetrahydrofuran and methylene chloride under anhydrous conditions and low temperature, there was formed the 21-acetate of 9α,10-difluoro-19-nor-prednisolone or of 9α-chloro-10-fluoro-nor-prednisolone.

By oxydation of the hydroxyl group at C–11 with chromic acid in dilute acetic acid the 21-acetates of 10-fluoro - 19 - nor - prednisone, 9α - bromo - 10 - fluoro-19-nor-prednisone, 9α-chloro-10-fluoro-19-nor-prednisone, and 9α,10-difluoro-19-nor-prednisone were obtained. Hydrolysis of the acetoxy group at C–21 yielded the free compounds which were then re-esterified by conventional means with the desired acid anhydride in pyridine solution.

The following examples serve to illustrate the present invention but are not intended to limit the same:

Example 1

A slow stream of perchloryl fluoride (FCLO₃) was introduced at room temperature and for 15 hours into a solution of 1 g. of estradiol in 50 cc. of dimethyl-formamide. After pouring into ice water the product was extracted with ethyl acetate and the extract was successively washed with 5% aqueous sodium bicarbonate solution and water, dried over anhydrous sodium sulfate and the solvent was evaporated. By chromatography of the residue on neutral alumina, there was obtained 10-fluoro-19-nor-Δ¹-testosterone; M.P. 152–154° C.; [α]$_D$ —27° (chloroform); λ max. 240 mµ, log E 4.06. Catalytic hydrogenation of the latter in pyridine solution over 10% palladium-barium sulfate catalyst afforded 10-fluoro - 19-nor-5β-androstan-17β-ol-3-one. Chromatography of the mother liquor yielded the 10-fluoro-19-nor-5α-androstan-17β-ol-3-one.

Example 2

In accordance with the method described in the preceding example, the 17-acetate of estradiol was treated with perchloryl fluoride to produce the acetate of 10-fluoro-19-nor-Δ¹-testosterone.

Example 3

In accordance with the method of Example 1, 17α-methyl-estradiol was converted into 17α-methyl-10-fluoro-19-nor-Δ¹testosterone; M.P. 100–102° C.; [α]$_D$ —52.5° (chloroform); λ max. 240 mµ, log E 4.01. 2 g. of the latter in 50 cc. if dioxane was hydrogenated in the presence of 10% palladium barium sulfate catalyst until no further absorption of hydrogen occurred. After filtering from the catalyst, the solution was evaporated to dryness and the residue chromatographed on 60 g. of neutral alumina. Elution with benzene and crystallization from acetonehexane afforded 10β-fluoro-17α-methyl-19-nor-5β-androstane-17β-ol-3-one; M.P. 160–161° C.; [α]$_D$ —8° (chloroform). Careful chromatography of the mother liquors afforded 10β-fluoro-17α-methyl-19-nor-5α-androstane-17β-ol-3-one.

Example 4

In accordance with the method of Example 1, the 17-caproate of 17α-ethyl-estradiol was converted into 17α-ethyl-10-fluoro-19-nor-Δ¹-testosterone 17-caproate.

Example 5

In accordance with the method described in Example 1, 17α-ethinyl-estradiol was converted into 17α-ethinyl-10-fluoro-19-nor-Δ¹-testosterone; M.P. 160–162° C.; [α]$_D$ —80° (chloroform); λ max. 240 mµ, log E. 4.05.

Example 6

In accordance with the method of Example 1, the 17-benzoate of estradiol was converted into that of 10-fluoro-19-nor-Δ¹-testosterone benzoate.

Example 7

A slow stream of perchloryl fluoride (FO₃Cl) was introduced for 15 hours into a solution of 1 g. of 17β- acetyl-1:3:5-estratrien-3-ol (described by Djerassi et al. in J.A.C.S. 73, 1523–1527 (1951)) in 50 cc. of dimethylformamide. The mixture was then poured into ice water, the reaction product was extracted with ethyl acetate, the extract was washed with 5% aqueous sodium bicarbonate solution and then with water to neutral, dried over anhydrous sodium sulfate and the solvent was evaporated. Chromatography of the residue on silica gel yielded 10-fluoro-19-nor-$\Delta^1$-progesterone, M.P. 108–109° C.; $[\alpha]_D$ +62° (chloroform); $\lambda$ max. 241 m$\mu$, log E 4.04.

*Example 8*

In the method of the preceding example, 17$\beta$-acetyl-1:3:5-estratrien-3-ol was substituted by 17$\alpha$-acetoxy-17$\beta$-acetyl-1:3:5-estratrien-3-ol, described in copending application Serial No. 830,209, filed July 29, 1959, thus affording 10 - fluoro-17$\alpha$-acetoxy-19-nor-$\Delta^1$-progesterone, M.P. 144–146° C.; $[\alpha]_D$ −33°; $\lambda$ max 240 m$\mu$ log E 4.06.

*Example 9*

In accordance wtih the method of Example 7, the 17-propionate of 17$\beta$-acetyl-1:3:5-estratriene-3,17$\alpha$-diol described in the above-mentioned copending application Serial No. 830,209 was converted into 10-fluoro-17$\alpha$-propionoxy-19-nor-$\Delta^1$-progesterone.

*Example 10*

In accordance with the method of Example 7, the 17-caproate of 17$\beta$-acetyl-1:3:5-estratriene-3,17$\alpha$-diol described in the above-mentioned copending application Serial No. 830,209 was converted into the caproate of 10-fluoro-17$\alpha$-hydroxy-19-nor-$\Delta^1$-progesterone.

*Example 11*

In accordance with the method of Example 7, the 17-cyclopentylpropionate of 17$\beta$-acetyl-1:3:5-estratriene-3,17$\alpha$-diol described in the above-mentioned copending application Serial No. 830,209 was converted into the cyclopentylpropionate of 10-fluoro-17$\alpha$-hydroxy-19-nor-$\Delta^1$-progesterone.

*Example 12*

In accordance with the method of Example 7, the 17-benzoate of 17$\beta$-acetyl-1:3:5-estratriene-3,17$\alpha$-diol described in the above-mentioned copending application Serial No. 830,209 was converted into the benzoate of 10-fluoro-17$\alpha$-hydroxy-19-nor-$\Delta^1$-progesterone.

*Example 13*

In accordance with the method of Example 7, 17$\beta$-acetyl-1:3:5-estratriene-3,17$\alpha$-diol was converted in 10-fluoro-17$\alpha$-hydroxy-19-nor-$\Delta^1$-progesterone.

*Example 14*

A slow stream of perchloryl fluoride (FO$_3$Cl) was introduced for 15 hours into a solution of 4 g. of 16$\alpha$-methyl-17$\beta$-acetyl-1:3:5-estratriene-3,17$\alpha$-diol in 200 cc. of dimethylformamide, at room temperature; the reaction mixture was then poured into ice-water and the product was extracted with several portions of ethyl acetate; the extract was washed with 5% aqueous sodium bicarbonate solution and then with water, dried over anhydrous sodium sulfate and the solvent was evaporated. By chromatography of the residue on silica gel there was obtained 10 - fluoro - 16$\alpha$-methyl-19-nor-$\Delta^{1,4}$-pregnadien-17$\alpha$-ol-3, 20-dione, i.e. 16$\alpha$ - methyl - 10-fluoro-1-dehydro-17$\alpha$-hydroxy-19-nor-progesterone.

The starting material, namely 16$\alpha$-methyl-17$\beta$-acetyl-1:3:5-estratriene-3,17$\alpha$-diol was obtained in the following manner:

To a solution of 5 g. of 17-acetyl-1:3:5:16-estratetraen-3-ol, described by Djerassi et al. in J. Am. Chem. Soc., 73, 1523 (1951), in 300 cc. of acetone there were alternatively added four portions of 14 cc. of 50% aqueous sodium hydroxide solution and 14 cc. of dimethyl sulfate, while the mixture was kept under reflux. The refluxing was continued for 10 minutes further and the mixture was cooled and diluted with water; the precipitate was collected by filtration, washed with water, dried and recrystallized from hexane containing a small amount of acetone, thus yielding 3-methoxy-17-acetyl-1:3:5:16-estratetraene.

A solution of 5 g. of the above compound in 100 cc. of dry benzene was added to a mixture of 200 cc. of dry benzene and an excess of methyl magnesium bromide; the mixture was refluxed for 4 hours, cooled and poured into 1 l. of ice-water containing 100 g. of ammonium chloride, under vigorous stirring. The organic layer was separated, washed with water, dried over anhydrous sodium sulfate and the benzene was evaporated. By chromatography of the residue on neutral alumina and crystallization of the solid fractions from acetone-hexane, there was obtained 16$\alpha$-methyl-3-methoxy-17$\beta$-acetyl-1:3:5-estratriene. 6 g. of this compound were subjected to a slow distillation with 2.7 g. of p-toluenesulfonic acid and 300 cc. of acetic anhydride, over a period of 18 hours, when 240 cc. of distillate was collected. The cooled residue was poured into ice-water, the product was extracted with ether and the extract was washed with 5% aqueous sodium bicarbonate solution and water, dried over anhydrous sodium sulfate and evaporated to dryness. The residue consisted of the crude 3-methyl-ether-20-acetate of 16$\alpha$-methyl-19-nor-$\Delta^{1,3,5(10),17(20)}$-pregnatetraene-3,20-diol.

6 g. of the above compound was treated with 240 cc. of a benzene solution of perbenzoic acid containing 1.2 molar equivalents of the reagent and the mixture was kept in the dark at room temperature for 20 hours. Water was then added, the benzene layer was separated and dried over anhydrous sodium sulfate and the solvent was evaporated.

The residue consisted of the 3-methyl-ether-20-acetate of 16$\alpha$-methyl-17,20-oxido-19-nor-$\Delta^{1,3,5(10)}$-pregnatriene-3,20-diol.

The above compound was mixed with 500 cc. of a 1% methanolic potassium hydroxide solution and kept for 1 hour at room temperature; the mixture was neutralized with acetic acid, concentrated to a small volume under reduced pressure, cooled and diluted with water. The precipitate was collected, washed with water, dried and recrystallized from methanol, thus producing 16$\alpha$-methyl-3-methoxy-17$\beta$-acetyl-1:3:5-estratrien-17$\alpha$-ol.

A mixture of 1 g. of the above compound, 25 cc. of acetic acid, 15 cc. of concentrated hydrochloric acid and 3 cc. of water was refluxed under nitrogen for 1 hour and diluted with water; the precipitate was collected, washed with water, dried and crystallized from acetone-hexane, thus furnishing 16$\alpha$-methyl-17$\beta$-acetyl-1:3:5-estratriene-3,17$\alpha$-diol.

*Example 15*

A mixture of 2 g. of 16$\alpha$-methyl-3-methoxy-17$\beta$-acetyl-1:3:5-estratrien-17$\alpha$-ol, 80 cc. of acetic acid, 40 cc. of acetic anhydride and 2 g. of p-toluenesulfonic acid was kept overnight at room temperature and then diluted with water. The precipitate formed was collected by filtration, washed with water, dried and recrystallized from acetone-hexane, to produce 16$\alpha$-methyl-3-methoxy-17$\beta$-acetyl-1:3:5-estratrien-17$\alpha$,ol-acetate; hydrolysis of the 3-methoxy group with a mixture of acetic and hydrochloric acids, by the procedure described in the preparation method of Example 1, gave 16$\alpha$-methyl-17$\beta$-acetyl-1:3:5-estratriene-3,17$\alpha$-diol 17-acetate. By treatment of the latter with perchloryl fluoride, by following the procedure described in the previous example, there was obtained 10-fluoro-16$\alpha$-methyl-19-nor-$\Delta^{1,4}$-pregnadien-17$\alpha$-ol-3,20-dione acetate.

*Example 16*

A mixture of 2 g. of 16$\alpha$-methyl-17$\beta$-acetyl-1:3:5-estratriene-3,17$\alpha$-diol-3-methyl-ether, 100 cc. of benzene, 2 g. of caproic anhydride and 500 mg. of p-toluenesulfonic acid was kept for 3 days at room temperature and diluted with water. The benzene layer was separated, washed with 5% aqueous sodium bicarbonate solution and then with water, dried over anhydrous sodium sulfate and the benzene was evaporated. By chromatography of the residue on neutral alumina there was obtained 3-methoxy-16α-methyl-17β-acetyl-1:3:5-estratrien-17α-ol caproate whose ether group was hydrolyzed by the procedure described in the preceding preparation method of Example 14, to produce 16α-methyl-17β-acetyl-1:3:5-estratriene-3,17α-diol 17-caproate.

In accordance with the method of Example 14, the treatment of the above compound with perchloryl fluoride afforded 16α-methyl-10-fluoro-1-dehydro-17α-hydroxy-19-nor-progesterone 17-caproate.

*Example 17*

By applying the esterification method of the previous example, but substituting the caproic anhydride by cyclopentylpropionic anhydride, 16β-methyl-3-methoxy-17β-acetyl-1:3:5-estratrien-17α-ol was converted into the corresponding cyclopentylpropionate. Hydrolysis of the 3-methoxy group, by the procedure described in the preparation method of Example 14 gave 16β-methyl-17β-acetyl - 1:3:5 - estratriene - 3,17α - diol 17 - cyclopentylpropionate.

The above compound was treated with perchloryl fluoride in dimethylformamide, in accordance with the method of Example 14, thus furnishing 10-fluoro-16β-methyl-19-nor - $\Delta^{1,4}$ - pregnadien - 17α - ol - 3,20 - dione cyclopentylpropionate.

The starting material, 16β-methyl-3-methoxy-17β-acetyl-1:3:5-estratrien-17α-ol was obtained by the following method of preparation:

A solution of 6 g. of 17-acetyl-3-methoxy-1:3:5:16-estratetraene in 200 cc. of methanol was treated with 12 cc. of aqueous sodium hydroxide solution immediately followed by 24 cc. of a 30% solution of hydrogen peroxide, with stirring and at a temperature around 15° C. The mixture was kept overnight in the refrigerator, then poured into ice-water and the precipitate was collected by filtration, washed with water, dried and recrystallized from acetone-hexane, thus yielding the 16α,17α-epoxide of the 3-methyl-ether of 17β-acetyl-1:3:5-estratrien-3-ol.

A mixture of 5 g. of the above compound, 300 cc. of anhydrous benzene, 35 cc. of ethylene glycol and 250 mg. of p-toluenesulfonic acid was refluxed for 48 hours with the use of a water separator. The cooled mixture was treated with 50 cc. of 2 N aqueous sodium carbonate solution and 500 cc. of water and the organic layer was separated, washed with water, dried over anhydrous sodium sulfate and the solvent was evaporated under reduced pressure. There was thus obtained the crude 3-methyl-ether-20-cyclo-ethyleneketal-16α,17α-oxido of 17β-acetyl-1:3:5-estratrien-3-ol, namely 3-methoxy-20-ethylenedioxy-16α,17α-oxido-19-nor-$\Delta^{1,3,5(10)}$-pregnatriene, which was used for the next step without further purification. A small amount of the compound was purified by chromatography on neutral alumina.

A mixture of 4 g. of the above crude compound, 200 cc. of anhydrous benzene and 60 cc. of a 4 N solution of methyl magnesium bromide in ether was refluxed for 20 hours; after cooling the mixture was poured with vigorous stirring into 200 cc. of ice-water containing 20 g. of ammonium chloride, the 800 cc. of water was added, the organic layer was separated and the aqueous phase was extracted with benzene; the benzene solutions were combined, washed with water to neutral, dried over anhydrous sodium sulfate and concentrated to 200 cc.; the residue was adsorbed on a column of 150 g. of washed alumina; upon elution with mixtures of benzene and ether there were obtained solid fractions which by crystallization from acetone-ether furnished 3-methoxy-16β-methyl-20-ethylenedioxy-19-nor-$\Delta^{1,3,5(10)}$-pregnatrien-17α-ol.

A mixture of 3 g. of the above compound, 100 cc. of acetone, 5 cc. of water and 500 mg. of p-toluenesulfonic acid was refluxed for 4 hours, cooled and diluted with water. The precipitate was collected by filtration, washed with water, dried and recrystallized from acetone-hexane, to produce 16β-methyl-17β-acetyl-1:3:5-estratriene-3,17α-diol 3-methyl-ether.

*Example 18*

In accordance with the method of Example 14, the treatment of 16β-methyl-17β-acetyl-1:3:5-estratriene-3,17α-diol obtained from 16β-methyl-3-methoxy-17β-acetyl-1:3:5-estratrien-17α-ol after hydrolysis of the methyl-ether group by the procedure described in the preparation method of Example 14, gave 10-fluoro-16β-methyl-19-nor-$\Delta^{1,4}$-pregnadien-17α-ol-3,20-dione, i.e. 10-fluoro-16β-methyl-1-dehydro-17α-hydroxy-19-nor-progesterone.

*Example 19*

A mixture of 1 g. of 16α-methyl-17β-acetyl-1:3:5-estratriene-3,17α-diol 3-methyl-ether, 10 cc. of propionic anhydride and 200 mg. of p-toluenesulfonic acid was kept overnight at room temperature, poured into water and the product was extracted with ethyl acetate; the extract was washed with water, 5% aqueous sodium bicarbonate solution and again with water, dried over anhydrous sodium sulfate and the solvent was evaporated. Crystallization of the residue from acetone-hexane afforded 16α-methyl-3-methoxy-17β-acetyl-1:3:5-estratrien-17α-ol propionate. Upon subsequent hydrolysis of the ether group, in accordance with the method described in the preparation method of Example 14, there was produced 16α-methyl - 17β - acetyl - 1:3:5 - estratriene - 3,17α - diol 17-propionate.

In accordance with the method of Example 14, the latter compound was treated with perchloryl fluoride to produce 10-fluoro-16α-methyl-19-nor-$\Delta^{1,4}$-pregnadien-17α-ol-3,20-dione propionate.

*Example 20*

A mixture of 1.0 g. of 16α-methyl-3-methoxy-17β-acetyl-1:3:5(10)-estratriene (prepared as an intermediate in Example 14), 25 cc. acetic acid, 15 cc. of concentrated hydrochloric acid and 3 cc. of water was refluxed under nitrogen for 1 hour, diluted with water, dried and crystallized from acetone-hexane, thus producing 16α-methyl-17β - acetyl - 1:3:5(10) - estratriene - 3 - ol. In accordance with the method of Example 14, the latter was transformed into 10-fluoro-16α-methyl-19-nor-$\Delta^1$-progesterone.

*Example 21*

A solution of 1 g. of $\Delta^{1,3,5(10)}$-19-nor-pregnatriene-3,21-diol-20-one-diacetate, described in U.S. Patent 2,791,593, in 10 cc. of dioxane was treated with 1 cc. of water and 1 cc. of concentrated hydrochloric acid and kept at room temperature for several hours. It was then diluted with water and the precipitate was collected, washed with water, dried and recrystallized from acetone-hexane, thus affording the 21-acetate of 19-nor-$\Delta^{1,3,5(10)}$-pregnatriene-3,21-diol-20-one. In accordance with the method of Example 7, the 21-acetate of $\Delta^{1,3,5(10)}$-19-nor-pregnatriene-3,21-diol-20-one was converted into 10-fluoro-19-nor-$\Delta^1$-desoxycorticosterone acetate.

*Example 22*

Following the method of the preceding example except that cyclopentylpropionic anhydride was utilized as the esterifying agent, there was obtained the 21-cyclopentylpropionate of $\Delta^{1,3,5(10)}$-19-nor-pregnatriene-3,21-diol-20-one which was converted into that of 10-fluoro-19-nor-$\Delta^1$-desoxycorticosterone by following the method of Example 7.

*Example 23*

In accordance with the method of Example 7, $\Delta^{1,3,5(10)}$-19 - nor - pregnatriene - 3,21 - diol was converted into 10-fluoro-19-nor-$\Delta^1$-desoxycorticosterone.

Example 24

A solution of 10 g. of the 3-acetate of the 17β-acetyl-1:3:5-estratrien-3,17α-diol (Djerassi et al. J. Am. Chem. Soc., 73, 1523 (1951)) in 200 cc. of chloroform was treated with 220 cc. of a 2% solution of bromine in chloroform, adding the latter in portions, with stirring and at temperatures around 15° C., always waiting until the mixture decolorized before each addition. The mixture was stirred for 5 minutes further and then treated with 100 cc. of 5% aqueous sodium bicarbonate solution; the organic layer was separated, washed with water to neutral, dried over anhydrous sodium sulfate and the chloroform was evaporated under reduced pressure and at room temperature. There was thus obtained the crude 3-acetate of 17β-bromoacetyl-1:3:5-estratriene-3,17α-diol. A small amount was purified by recrystallization from acetone-hexane; M.P. 161–163° C. (dec.); $[\alpha]_D + 56°$ (chloroform).

10 g. of the above crude compound was treated with 360 cc. of methanol and 12 cc. of concentrated hydrochloric acid and kept overnight at room temperature, diluted with water and the precipitate was collected, washed with water, dried and used for the next stage without further purification. A small amount of the product, namely 17β-bromoacetyl-1:3:5-estratriene-3,17α-diol, was purified by recrystallization from acetone-hexane; M.P. 181–183° C. (dec.); $[\alpha]_D + 81°$ (chloroform); λmax. 280–282 mμ, log E 3.2.

A mixture of 9 g. of the above compound, 14 g. of recently fused potassium acetate, 7.2 g. of sodium iodide and 360 cc. of acetone was refluxed under anhydrous conditions for 20 hours. The solvent was evaporated under reduced pressure, the residue was diluted with water and the crude product was collected, washed with water, dried, recrystallized from methanol and then from acetone-hexane, thus yielding 17β-(acetoxy-acetyl)-1:3:5-estratriene-3,17α-diol, M.P. 187–190° C.; $[\alpha]_D + 124°$ (chloroform); λmax. 252 mμ, log E 3.29.

A mixture of 2 g. of the above compound and 100 cc. of a 1% solution of potassium hydroxide in methanol was stirred under an atmosphere of nitrogen for 1 hour at 0° C.; it was then acidified with acetic acid, concentrated to a small volume under reduced pressure, diluted with water and the precipitate was collected, washed with water, dried and recrystallized from acetone-hexane, thus affording 17β-hydroxyacetyl-1:3:5-estratriene-3,17α-diol (19-nor-$\Delta^{1,3,5(10)}$-pregnatriene-3β,17α,21-triol-20-one); M.P. 229–231° C.; $[\alpha]_D + 80°$ (chloroform); λmax. 282 mμ, log E 3.30.

Example 25

A slow stream of perchloryl fluoride (FO$_3$Cl) was introduced for 15 hours into a solution of 5 g. of 17β-acetoxyacetyl-1:3:5-estratriene-3,17α-diol of the preceding example, in 250 cc. of dimethylformamide, at room temperature. After pouring into ice water the reaction product was extracted with ethyl acetate and the extract was washed with 5% aqueous sodium bicarbonate solution and with water to neutral, dried over anhydrous sodium sulfate and the solvent was evaporated. Chromatography of the residue on silica gel afforded the 21-acetate of 10-fluoro-19-nor-$\Delta^{1,4}$-pregnadiene-17α,21-diol-3,20-dione; by subsequent alkaline hydrolysis under mild conditions, by following the method of hydrolysis described in the preceding Example, there was obtained 10-fluoro-19-nor-$\Delta^{1,4}$-pregnadiene-17α,21-diol-3,20-dione under the form of the free alcohol.

There were prepared the following solutions "A," "B" and "C"—using distilled water as solvent; 425 cc. of a 1.742% solution of dipotassium hydrogen phosphate (K$_2$HPO$_4$) was mixed with 75 cc. of 1.38% sodium dihydrogen phosphate solution to obtain solution "A"; a mixture of 1 lt. of 4.5% solution of sodium chloride, 40 cc. of 5.75 potassium chloride solution and 10 cc. of 19.1% magnesium sulfate solution was diluted to a volume of 5 lt. to obtain solution "B"; 20.9 of fumaric acid and 14.4 g. of sodium hydroxide were dissolved in 1 lt. of water and the solution was diluted to 1.2 lt. to obtain solution "C." There were mixed 475 cc. of solution "A," 4.32 lt. of solution "B" and 1.2 lt. of solution "C."

The fat was removed from the adrenal glands of recently slaughtered bovine, and the glands were then ground in a meat grinder until an homogeneous mass was obtained; to 3 kg. of this mass was added 6 lt. of the mixture of solutions "A," "B" and "C" obtained as described above, and the mixture was stirred vigorously.

There was then added 3 g. of 10-fluoro-19-nor-$\Delta^{1,4}$-pregnadiene-17α,21-diol-3,20-dione dissolved in 16 cc. of propylene glycol; the mixture was stirred at 28–37° C. for 3 hours. Then 40 lt. of acetone was added and the stirring was continued at room temperature for 1 hour more.

The solid was filtered, washed with 2 portions of 10 lt. each of acetone, the washings were combined with the filtrate and the solution was concentrated to a volume of approximately 5 lt. under reduced pressure and maintaining the temperature below 30° C. The aqueous residue was washed with three portions of 4 lt. of hexane and the hexane was discarded. The solution was then extracted with two portions of 3 lt. each of methylene chloride and the extract was washed with water, dried over anhydrous sodium sulfate, filtered and concentrated to a volume of 300 cc. under reduced pressure and taking care that the temperature remained below room temperature.

The concentrated solution was transferred to a column charged with 90 g. of silica gel and 90 g. of celite and the column was washed with 3 lt. of methylene chloride and then with a mixture of 900 cc. of methylene chloride and 100 cc. of acetone. The product was eluted with mixtures of methylene chloride and acetone (80:20 and 70:30). The solvent from these elutions was evaporated and the residue crystallized from ethyl acetate. There was thus obtained 10-fluoro-19-nor-prednisolone.

1 g. of the above compound was dissolved in 10 cc. of pyridine, treated with 1 cc. of acetic anhydride and the mixture was kept overnight at room temperature. After pouring into ice water the mixture was stirred for half an hour and the precipitate was collected by filtration, washed, dried and recrystallyzed from acetone-hexane, thus yielding the 21-acetate of 10-fluoro-19-nor-prednisolone.

A solution of 500 mg. of the above compound in 30 cc. of acetic acid was slowly treated under stirring with a solution of 160 mg. of chromium trioxide in a mixture of 8 cc. of acetic acid and 4 cc. of water. The mixture was kept at room temperature for 2 hours, poured into water and the precipitate was collected, washed with water, dried and recrystallized from acetone-hexane, thus affording the 21-acetate of 10-fluoro-19-nor-prednisone.

A mixture of 1 g. of the above compound and 10 cc. of absolute methanol was cooled to 0° C., treated with a solution of sodium methoxide prepared by dissolving 60 mg. of sodium metal in 10 cc. of absolute methanol and the mixture was stirred at 0° C. under an atmosphere of nitrogen for 1 hour. It was then poured into 100 cc. of saturated sodium chloride solution containing 0.5 cc. of acetic acid and the precipitate was collected, washed with water, dried and recrystallized from acetone-hexane, to produce the free 10-fluoro-19-nor-prednisone.

Example 26

5 g. of the 21-acetate of 10-fluoro-19-nor-prednisolone, prepared in accordance with the method of the preceding example, was dissolved with slight heating in 70 cc. of dimethylformamide and 7.5 cc. of pyridine; the mixture was cooled, treated with 2.5 g. of mesyl chloride and heated at 80° C. for 30 minutes. After cooling water was added and the product was extracted with ethyl acetate, washed with water, dried over anhydrous sodium sulfate and the solvent was evaporated, the residue was purified by recrystallization from acetone-hexane. There was thus obtained the 21-acetate of 10-fluoro-19-nor-$\Delta^{1,4,9(11)}$-pregnatriene-17α,21-diol-3,20-dione.

A mixture of 3.75 g. of the above compound, 40 cc. of pure dioxane and 6 cc. of 0.4 N perchloric acid was treated at room temperature and in the course of 1 hour with 2.0 g. of N-bromoacetamide, in the dark. The mixture was stirred for 1 hour further and then treated with 10% aqueous sodium bisulfite solution until the starch-potassium iodide indicator paper no longer turned blue. Ice and 60 cc. of chloroform were added and the organic layer was separated, successively washed with water, sodium bicarbonate solution and water, and the solvent was evaporated under reduced pressure in a bath at a temperature below 25° C. Upon trituration of the residue with acetone and cooling, there was obtained the 21-acetate of 9α-bromo-10-fluoro-19-nor-prednisolone.

By following the method of oxidation described in the preceding example there was then obtained the 21-acetate of 9α-bromo-10-fluoro-19-nor-prednisone.

*Example 27*

A solution of 4 g. of the 21-acetate of 9α-bromo-10-fluoro-19-nor-prednisolone (Example 26) in 8 cc. of dioxane was slowly added to a mixture of 1.3 g. of anhydrous potassium acetate and 16 cc. of absolute methanol which had been heated almost to boiling. The mixture was refluxed for 45 minutes, cooled and mixed under continuous stirring with 50 cc. of water. The precipitate was collected by filtration, washed with water and dried. There was thus obtained the 21-acetate of 10-fluoro-9β,11β-oxido-19-nor-$\Delta^{1,4}$-pregnadiene-17α,21-diol-3,20-dione.

A mixture of 2.5 g. of the above compound, 9 g. of tetrahydrofurane and 30 cc. of methylene chloride was cooled in a Dry Ice bath and slowly added with stirring to 5 g. of liquid hydrogen fluoride which was also cooled in Dry Ice bath. The reaction mixture was kept for 17 hours at 0° C. and then added portionwise to a stirred mixture of 450 cc. of ice water, 75 cc. of methylene chloride and 30 g. of sodium bicarbonate. The methylene chloride was separated, the aqueous phase was extracted with methylene chloride and the methylene chloride solutions were combined and washed with water, dried over anhydrous sodium sulfate and the solvent was evaporated. The residue was purified by chromatography on silica gel, thus giving the 21-acetate of 9α,10-difluoro-19-nor-prednisolone.

2 g. of the above compound was dissolved in 80 cc. of acetic acid and treated with a solution of 400 mg. of chromium trioxide in 10 cc. of 80% acetic acid; after 2 hours at room temperature the oxidation product was isolated as described in Example 25 to produce the 21-acetate of 9α,10-difluoro-19-nor-prednisone.

*Example 28*

To a solution of 4g. of the 21-acetate of 10-fluoro-9β,11β-oxido - 19 - nor-$\Delta^{1,4}$-pregnadiene-17α,21-diol-3,20-dione in 40 cc. of redistilled chloroform, was added, over a period of 35 minutes, 30 cc. of a 0.45 N solution of dry hydrogen chloride in chloroform, under continuous stirring and maintaining the temperature around 0° C. The mixture was then stirred at 0° C. for 1 hour further, diluted with water and the chloroform layer was separated, washed with aqueous sodium bicarbonate solution and then with water, dried over anhydrous sodium sulfate and the chloroform was evaporated under reduced pressure. Crystallization of the residue furnished the 21-acetate of 9α-chloro - 10 - fluoro-19-nor-prednisolone; upon subsequent oxidation with chromic acid, in accordance with the method of Example 25, there was obtained the 21-acetate of 9α-chloro-10-fluoro-19-nor-prednisone.

*Example 29*

By hydrolysis with dilute methanolic potassium hydroxide, in accordance with the procedure described in Example 24, 2 g. of the 21-acetate of 9α,10-difluoro-19-nor-prednisolone (Example 27) was converted into the free 9α,10-difluoro-19-nor-prednisolone. A solution of 1.5 g. of the latter in 15 cc. of pyridine was treated with 3 cc. of propionic anhydride and kept overnight at room temperature; after pouring into water the mixture was heated for half an hour on the steam bath, cooled and the precipitate was collected, washed with water, dried and recrystallized from acetone-hexane, thus affording the 21-propionate of 9α,10-difluoro-19-nor-prednisolone.

*Example 30*

A mixture of 2 g. of 10-fluoro-19-nor-prednisolone of Example 25, 10 cc. of pyridine and 10 g. of cyclopentylpropionic anhydride was kept at room temperature for 48 hours, diluted with water, heated for 2 hours on the steam bath, cooled, extracted with ethyl acetate and the extract was washed with dilute hydrochloric acid, then with 5% aqueous sodium bicarbonate solution and finally with water to neutral. The extract was dried over anhydrous sodium sulfate, the solvent was evaporated and the residue purified by chromatography on neutral alumina, to produce the 21-cyclopentylpropionate of 10-fluoro-19-nor-prednisolone. By subsequent oxidation with chromic acid, in accordance with Example 25, there was obtained the 21-cyclopentylpropionate of 10-fluoro-19-nor-prednisone.

*Example 31*

1 g. of 10-fluoro-19-nor-prednisolone, obtained in accordance with the method of Example 25 was dissolved in 10 cc. of pyridine, treated with 2 g. of succinic anhydride and kept standing overnight; it was then poured into water and the precipitate was collected, washed with water, dried and recrystallized from acetone-hexane, thus giving the 21-hemisuccinate of 10-fluoro-19-nor-prednisolone.

The above compound was dissolved in a 1% solution of sodium hydroxide in methanol containing 1 molar equivalent of the alkali and the methanol was removed by distillation under reduced pressure. The residue consisted of the sodium salt of the 21-hemisuccinate of 10-fluoro-19-nor-prednisolone, which compound is soluble in water.

*Example 32*

A solution of 1 g. of 10-fluoro-19-nor-prednisolone in 10 cc. of pyridine was treated with 1.1 molar equivalents of chloracetic anhydride and kept overnight at room temperature; after pouring into water the precipitate was collected by filtration, washed with water, dried and recrystallized from acetone-hexane. There was thus obtained the 21-chloroacetate of 10-fluoro-19-nor-prednisolone.

To a solution of 500 mg. of the above compound in 20 cc. of benzene was added 2 cc. of propylamine and the mixture was refluxed for 1 hour. It was then cooled, the benzene layer was separated, washed with water, dried over anhydrous sodium sulfate, the benzene was evaporated and the residue recrystallized from acetone-hexane, thus giving the propylaminoacetate of 10-fluoro-19-nor-prednisolone.

A solution of 300 mg. of the above compound in 10 cc. of methanol containing 0.3 cc. of concentrated hydrochloric acid was evaporated to dryness under reduced pressure. The residue consisted of the hydrochloride of the 21-propylaminoacetate of 10-fluoro-19-nor-prednisolone, which compound is soluble in water.

*Example 33*

1 g. of the 21-acetate of 10-fluoro-19-nor-$\Delta^{1,4}$-pregnadiene-17α,21-diol-3,20-dione, obtained as described in Example 25 was dissolved in 25 cc. of glacial acetic acid, mixed with 5 cc. of acetic anhydride and 1 g. of p-toluenesulfonic acid and the mixture was kept overnight at room temperature; it was then poured into water and the precipitate was collected, washed with water, dried and recrystallized from acetone-hexane, thus giving the diacetate of 10-fluoro-19-nor-$\Delta^{1,4}$-pregnadiene-$17\alpha$,21-diol-3,20-dione.

*Example 34*

By essentially following the procedure described in the preceding example, the 21-acetate of 19-nor-$\Delta^{1,3,5(10)}$-pregnatriene-3,17α,21-triol-20-one was converted into the triacetate of 19-nor-$\Delta^{1,3,5,(10)}$-pregnatriene-3,17α,21-triol-20-one.

A solution of 1 g. of the above compound in 10 cc. of dioxane was treated with 1 cc. of water and 1 cc. of concentrated hydrochloric acid and kept at room temperature for 4 hours. It was then diluted with water and the precipitate was collected, washed with water, dried and recrystallized from acetone-hexane, thus furnishing the 17,21-diacetate of 19-nor-$\Delta^{1,3,5(10)}$-pregnatriene-3,17α,21-triol-20-one. By subsquent reaction with perchloryl fluoride, by essentially following the procedure described in Example 25, there was obtained the diacetate of 10-fluoro-19-nor-$\Delta^{1,4}$-pregnadiene-17α,21-diol-3,20-dione.

*Example 35*

1.0 g. of 16α-methyl-17β-acetyl-1:3:5-estratriene-3,17α-diol (prepared in Example 14) was monoacetylated at C-3 by heating with acetic anhydride-pyridine on the steam bath for one hour. By following the procedure of Example 24, there was obtained 16α-methyl-19-nor-$\Delta^{1,3,5,(10)}$-pregnatriene-3β,17α,21-triol-20-one and by following the procedure of Example 25, there were obtained the 21-acetate of 10-fluoro-16α-methyl-19-nor-$\Delta^{1,4}$-pregnadiene-17α,21-diol-3,20-dione and the free alcohol, 10-fluoro-16α-methyl-19-nor-$\Delta^{1,4}$-pregnadiene-17α,21-diol-3,20-dione which was transformed into 16α-methyl-10-fluoro-19-nor-prednisolone and the 21-acetate of 16α-methyl-10-fluoro-19-nor-prednisolone. Upon oxidation with chromic trioxide in the manner set forth in Example 25, 10-fluoro-16α-methyl-19-nor-prednisone and the 21-acetate thereof were obtained.

*Example 36*

By following the method of Example 26, there were obtained the corresponding 16α-methyl derivatives of the 21-acetate of 9α-bromo-10-fluoro-19-nor-prednisolone and of 9α-bromo-10-fluoro-19-nor-prednisone from the 21-acetate of 16α-methyl-10-fluoro-19-nor-prednisolone prepared in the preceding example.

*Example 37*

The 21-acetate of 16α-methyl-9α-bromo-10-fluoro-19-nor-prednisolone (Example 36) was converted into the 21-acetate of 16α-methyl-9β,11β-oxido-19-nor-$\Delta^{1,4}$-pregnadiene-17α,21-diol-3,20-dione and subsequently into the 21-acetate of 16α-methyl-9α,10-difluoro-19-nor-prednisolone and the 21-acetate of 16α-methyl-9α,10-difluoro-19-nor-prednisone by the method of Example 27, which were then transformed into the free alcohols and subsequently reesterified at C-21 with propionic anhydride in accordance with the method of Example 29 to afford the 21-propionate of 16α-methyl-9α,10-difluoro-19-nor-prednisolone and the 21-propionate of 16α-methyl-9α,10-difluoro-19-nor-prednisone.

*Example 38*

By following the methods of Examples 30, 31 and 32, there were obtained the corresponding 21-esters of 16α-methyl-9α,10-difluoro-19-nor-prednisolone and of 16α-methyl-9α,10-difluoro-19-nor-prednisone.

*Example 39*

In accordance with the method of Example 28, the 21-acetate of 16α-methyl-9β,11β-oxido-19-nor-$\Delta^{1,4}$-pregnadiene-17α,21-diol-3,20-dione obtained in Example 37 was converted into the 21-acetate of 16α-methyl-9α-chloro-10-fluoro-19-nor-prednisolone and then into the 16α-methyl-9α-chloro-10-fluoro-19-nor-prednisone.

*Example 40*

A mixture of 1 g. of 16β-methyl-17β-acetyl-1:3:5-estratriene-3,17α-diol-3-methyl ether prepared in Example 17, 25 cc. of acetic acid, 15 cc. of concentrated hydrochloric acid, and 3 cc. of water was refluxed under nitrogen for one hour and diluted with water; the precipitate was collected, washed with water, dried and crystallized from acetone-hexane, thus furnishing 16β-methyl-17β-acetyl-1:3:5-estratriene-3,17α-diol. Following the methods of Examples 35, 36, 37, 38 and 39, the corresponding 16β-methyl derivatives therein were formed.

I claim:

1. A compound of the following formula:

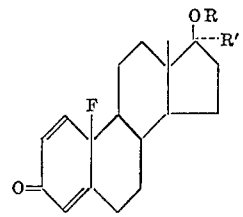

wherein R is selected from the group consisting of hydrogen and a hydrocarbon carboxylic acyl group of less than 12 carbon atoms and R' is selected from the group consisting of hydrogen and aliphatic hydrocarbon containing from 1 to 8 carbon atoms.

2. 10-fluoro-19-nor-$\Delta^1$-testosterone.

3. 10-fluoro-17α-methyl-19-nor-$\Delta^1$-testosterone.

4. 10-fluoro-17α-ethinyl-19-nor-$\Delta^1$-testosterone.

5. The hydrocarbon carboxylic acid esters of less than 12 carbon atoms of 10-fluoro-19-nor-$\Delta^1$-testosterone.

6. A compound of the following formula:

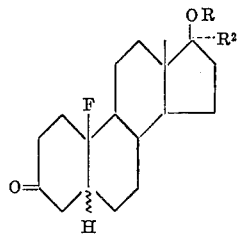

wherein R is selected from the group consisting of hydrogen and a hydrocarbon carboxylic acyl group of less than 12 carbon atoms and $R^2$ is selected from the group consisting of hydrogen, alkyl and alkenyl containing from 1 to 8 carbon atoms.

7. 10-fluoro-17α-methyl-19-nor-5α-androstane-17β-ol-3-one.

8. 10-fluoro-17α-methyl-19-nor-5β-androstane-17β-ol-3-one.

9. A compound of the following formula:

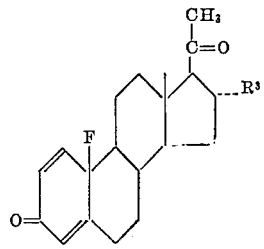

wherein $R^3$ is selected from the group consisting of hydrogen and α-methyl.

10. 10-fluoro-19-nor-$\Delta^1$-progesterone.

11. 10-fluoro-16α-methyl-19-nor-$\Delta^1$-progesterone.

12. A compound of the following formula:

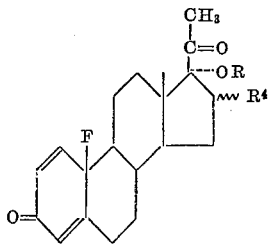

wherein R is selected from the group consisting of hydrogen and a hydrocarbon carboxylic acyl group of less than 12 carbon atoms and $R^4$ is selected from the group consisting of hydrogen, α-methyl and β-methyl.

13. 10-fluoro-17α-hydroxy-19-nor-$\Delta^1$-progesterone.

14. 10 - fluoro - 16α - methyl - 17α-hydroxy-19-nor-$\Delta^1$-progesterone.

15. The hydrocarbon carboxylic acid esters of less than 12 carbon atoms of 10-fluoro-17α-hydroxy-19-nor-$\Delta^1$-progesterone.

16. The acetate of 10 - fluoro - 17α-hydroxy-19-nor-$\Delta^1$-progesterone.

17. A compound of the following formula:

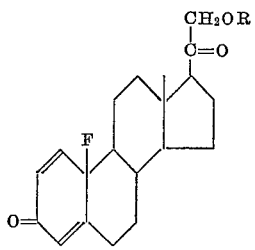

wherein R is selected from the group consisting of hydrogen and a hydrocarbon carboxylic acyl group of less than 12 carbon atoms.

18. A compound of the following formula:

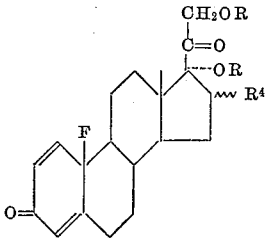

wherein R is selected from the group consisting of hydrogen and a hydrocarbon carboxylic acyl group of less than 12 carbon atoms and $R^4$ is selected from the group consisting of hydrogen, α-methyl and β-methyl.

19. The 21-acetate of 10-fluoro-19-nor-$\Delta^{1,4}$-pregnadiene-17α,21-diol-3,20-dione.

20. 10 - fluoro - 16α - methyl - 19-nor-$\Delta^{1,4}$-pregnadiene-17α,21-diol-3,20-dione-21-acetate.

21. A compound of the following formula:

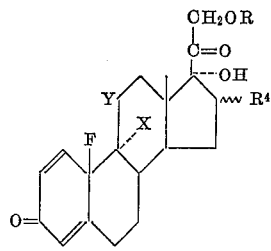

wherein R is selected from the group consisting of hydrogen and a hydrocarbon carboxylic acyl group of less than 12 carbon atoms; $R^4$ is selected from the group consisting of hydrogen, α-methyl and β-methyl; Y is selected from the group consisting of keto and β-hydroxy and X is selected from the group consisting of hydrogen, chlorine, bromine and fluorine.

22. 10-fluoro-19-nor-prednisolone.
23. 10-fluoro-19-nor-prednisone.
24. 16α-methyl-10-fluoro-19-nor-prednisolone.
25. 9α,10-difluoro-19-nor-prednisolone.
26. 9α,10-difluoro-19-nor-prednisone.
27. 9α-chloro-10-fluoro-19-nor-prednisone.
28. 9α,10-difluoro-16α-methyl-19-nor-prednisolone.

29. The hydrocarbon carboxylic acid esters of less than 12 carbon atoms of 10-fluoro-19-nor-prednisolone.

30. The hydrocarbon carboxylic acid esters of less than 12 carbon atoms of 10-fluoro-19-nor-prednisone.

References Cited in the file of this patent

UNITED STATES PATENTS 2,729,654    Colton _____ Jan. 3, 1956

OTHER REFERENCES

Mukawa Tetrahedron Letters, No. 14 (1959), pp. 17–20.

Kissman et al.: J. Am. Chem. Soc., vol. 82 (1960) pp. 2312–2317.